United States Patent
Moos (10) Patent No.: US 10,759,480 B2
(45) Date of Patent: Sep. 1, 2020

(54) FASTENING BODY FOR FASTENING AN UNDERBODY LINER TO A MOTOR VEHICLE UNDERBODY

(71) Applicant: Röchling Automotive SE & Co. KG, Mannheim (DE)

(72) Inventor: Egon Moos, Neustadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 93 days.

(21) Appl. No.: 16/117,548

(22) Filed: Aug. 30, 2018

(65) Prior Publication Data
US 2019/0071132 A1 Mar. 7, 2019

(30) Foreign Application Priority Data
Sep. 5, 2017 (DE) .......................... 10 2017 215 587

(51) Int. Cl.
*B62D 35/02* (2006.01)
*B60R 13/08* (2006.01)
(Continued)

(52) U.S. Cl.
CPC .......... *B62D 35/02* (2013.01); *B60R 13/0861* (2013.01); *B62D 27/023* (2013.01); *B62D 29/048* (2013.01)

(58) Field of Classification Search
CPC . B60R 13/08; B60R 13/0861; B62D 25/2072; B62D 27/023; B62D 27/065; B62D 29/048; B62D 35/02
(Continued)

(56) References Cited

U.S. PATENT DOCUMENTS 3,829,150 A * 8/1974 Moore ................ B60R 13/0206
296/39.3
8,746,782 B2 * 6/2014 Naoi ...................... B62D 25/10
180/69.1
(Continued)

FOREIGN PATENT DOCUMENTS

DE 19633058 A1 2/1998
DE 102009018007 A1 10/2010
FR 3073195 A1 * 5/2019 ............. B62D 35/02

OTHER PUBLICATIONS

English translation of FR 3073195; retreived on Jan. 30, 2020 via PatentTranslate located at www.epo.org. (Year: 2020).*
(Continued)

*Primary Examiner* — Jason S Daniels
(74) *Attorney, Agent, or Firm* — Rankin, Hill & Clark LLP (57) ABSTRACT

A fastening body for fastening an underbody liner component to a motor vehicle underbody, the fastening body encompassing
 a bracing segment having a passthrough opening penetrable along a penetration axis by a fastening means when the fastening body is in the operationally ready state, and having a bracing region, embodied in the surrounding region of the passthrough opening, which is provided for abutment of a counterpart bracing region of the fastening means;
 a liner segment that is arranged at a distance from the bracing segment and comprises, at least on its outer side facing away from the bracing region, a preferably flat outer surface; and
 a connecting segment connecting the bracing segment and the liner segment.

19 Claims, 6 Drawing Sheets

(51) Int. Cl.
*B62D 27/02* (2006.01)
*B62D 29/04* (2006.01)

(58) Field of Classification Search
USPC .......................................... 296/29, 38, 180.1
See application file for complete search history.

(56) References Cited

U.S. PATENT DOCUMENTS

| 9,126,631 B2 | 9/2015 | Lungershausen |
| 10,246,135 B2* | 4/2019 | Kayadere ................ B62D 35/02 |
| 2015/0008698 A1* | 1/2015 | Reisenhofer ........... B62D 25/20 |
| | | 296/180.1 |

OTHER PUBLICATIONS

German Search Report for corresponding DE 10 2017 215 587.6 dated Jul. 8, 2018, 8 pgs.
Espacenet Bibliographic data:DE 102009018007(A1), Published Oct. 21, 2010, 1pg.
Espacenet Bibliographic data:DE 19633058(A1), Published Feb. 19, 1998,1pg.
Dr.-Ing. Thomas Schütz et al.: Hucho—Aerodynamik des Automobils. 6th ed., Springer (2005, 2013) (ATZ/MTZ Fachbuch). 169.—ISBN 978-3-8348-2316-8 [eBook].

\* cited by examiner

FASTENING BODY FOR FASTENING AN UNDERBODY LINER TO A MOTOR VEHICLE UNDERBODY

The present invention relates to a fastening body for fastening an underbody liner component to a motor vehicle underbody.

BACKGROUND OF THE INVENTION

Underbody liners as a rule are planar structures whose thickness direction has considerably smaller dimensions than the two main extension directions, orthogonal both to the thickness direction and the one another, of the planar underbody liner. The planar configuration furthermore does not preclude the underbody liner as a whole from being of three-dimensional conformation, i.e. from being planar but not necessarily flat.

At least three objectives are pursued with an underbody liner on a vehicle: firstly, the underbody of the vehicle is to be protected from mechanical effects, for example stone impacts and the like. Secondly, the underbody liner often provides acoustic insulation for a vehicle, the underbody liner being intended both to decrease the vehicle's acoustic emissions and to decrease the penetration of noise from outside into the vehicle passenger compartment. Third, the underbody liner is intended to improve the vehicle's aerodynamics by the fact that the underbody liner creates a smoother or less-profiled lower terminating surface of a vehicle than would be the case without mounting of an underbody liner.

In the context of mounting of an underbody liner component that is intended to furnish a maximally smooth, flat lower terminating surface on the vehicle, locally different height differences between the lower outer surface (liner surface) of the underbody liner component and the vehicle underbody often need to be spanned. Boss-like bulges that extend away from what is later the lower outer surface of the underbody liner are often configured for that purpose on the underbody liner component. These boss-like bulges are also referred to in the present Application as "fastening bosses."

These boss-like bulges, constituting an installation configuration for connecting the underbody liner component to a vehicle underbody, generally taper in a direction away from the lower terminating surface of the underbody liner toward the vehicle underbody. An installation segment that is located in the boss-like bulge farther from what is later the lower terminating surface of the underbody liner, and is generally flat, has as a rule an installation opening, passing completely through it in a thickness direction, which is penetrated by a fastening means when the underbody liner is in the fully installed state. The fastening means generally braces against the installation segment in the vicinity of the installation opening.

In order to increase the tear-out resistance of the installation segment, as a rule a washer is arranged between the installation segment and the fastening means, in order to increase the area over which the fastening means exerts force onto the underbody liner component.

The boss-like bulged-out fastening bosses of the underbody liner component have, in what is later the terminating surface of the underbody liner fully installed on the vehicle, a considerable opening that disrupts the aerodynamic effect of the underbody liner component. Ideally, the lower terminating surface of a motor vehicle is as flat as possible. As a rule, the greater the deviation of the lower terminating surface from the flat state, the greater the deviation of the aerodynamic effect of the underbody liner component from the desired optimal aerodynamic effect.

SUMMARY OF THE INVENTION

An object of the present invention is to furnish a technical teaching that makes possible the installation of underbody liner components on vehicle underbodies using simple means, and that improves the aerodynamic effect of a predetermined underbody liner component.

According to the present invention the object is achieved by a fastening body that encompasses:
- a bracing segment having a passthrough opening penetrable along a penetration axis by a fastening means when the fastening body is in the operationally ready state, and having a bracing region, embodied in the surrounding region of the passthrough opening, which is provided for abutment of a counterpart bracing region of the fastening means;
- a liner segment that is arranged at a distance from the bracing segment and comprises, at least on its outer side facing away from the bracing region, a preferably flat outer surface; and
- a connecting segment connecting the bracing segment and the liner segment.

The fastening body according to the present invention is embodied for arrangement in the previously described boss-like bulged-out fastening boss of an underbody liner component. Its bracing segment can then come into abutment against the previously described installation segment of the underbody liner component and thereby increase the tear-out resistance of the underbody liner component. A thickening of material in the region where the fastening means is arranged on the underbody liner component can thus be achieved. The previously described backing washer can be eliminated or, if it continues to be placed, the tear-out resistance of the one-piece underbody liner component, usually made of plastic, can be even further increased.

The material thickness in the vicinity of the fastening means passing through the bracing segment of the fastening body and the installation segment of the fastening configuration of the underbody liner component is thus greater with a fastening body than without it.

When the underbody liner is in the fully installed state the liner segment can close off the opening, originally present in the liner surface of the underbody liner component, of the fastening boss, so that the underbody liner made up of the underbody liner component and fastening body is less strongly profiled than the underbody liner component considered of itself. Because the liner segment and the bracing segment are connected to one another by means of the connecting segment, utilization of the bracing segment that increases tear-out resistance also directly causes the liner segment (which improves aerodynamics) to be arranged in the desired location and orientation on the underbody liner component, which considerably simplifies installation.

In order to furnish a fastening body that is as stable and at the same time as light as possible, it is advantageous if it occupies a certain volume while having a low density. Because it is intended to be arranged in the cavity formed by the fastening boss, and because the fastening boss tapers away from the lower terminal surface (liner surface) of the underbody liner component toward the vehicle underbody, it is advantageous if the fastening body also has, in the operationally ready state, a conformation that tapers from the liner segment toward the bracing segment. It preferably has a frustoconical conformation, such that the bracing segment constitutes a smaller end surface, the liner segment a larger end surface, and the connecting segment an enveloping surface of the frustoconical conformation.

Entirely independently of whether or not the tapering conformation of the fastening body is a frustoconical conformation, the connecting segment is preferably intended to constitute an enveloping surface, extending around both the bracing segment and the liner segment, of the fastening body. The latter can also, in a departure from the preferred frustoconical conformation, have a truncated spherical conformation and the like. Regardless of the conformation of the connecting segment, preferably the bracing segment and the liner segment, or at least their surfaces that face outward with respect to the fastening body, are parallel to one another, preferably each flat and parallel to one another.

It has proven to be successful if the tapering fastening boss is inclined to different degrees on different sides. In the fully installed state it usually falls away from the installation segment of the fastening boss, toward the region of the underbody liner component forming the liner surface, more steeply in one region than in another region. Preferably a region having a largest inclination angle and a region having a smallest inclination angle are located diametrically opposite one another with reference to a longitudinal axis of the fastening means passing through the installation opening of the fastening boss.

For maximally complete filling of the cavity enclosed by the fastening boss, the fastening body is preferably embodied complementarily thereto.

In the interest of maximally complete filling, by the fastening body, of the cavity furnished by the fastening boss, according to an advantageous refinement of the present invention provision is made that the enveloping surface of the tapering fastening body has along its circumference different inclination angles relative to the bracing segment. Preferably the enveloping surface has, in a first circumferential region, a larger inclination angle in a first inclination angle range. The first circumferential region extends over approximately at least a quarter, preferably at least two thirds, particularly preferably half of the circumference of the enveloping surface. For reasons of simplified production, the inclination angle of the first circumferential region is constant, or changes by no more than 8% with respect to the largest inclination angle that occurs.

In a second circumferential region, different from the first, which extends over approximately at least a quarter, preferably at least two thirds, particularly preferably over the other half of its circumference, the enveloping surface can have a smaller inclination angle than in the first circumferential region. The second inclination angle range contains inclination angles having smaller values than the first inclination angle region. In order to furnish particularly good stability for the fastening body, in the second circumferential region the inclination angle first decreases in a circumferential direction from edge to edge, and then increases again starting from a minimum value. The inclination angle in the second circumferential region therefore changes more greatly along the second circumferential region than in the first circumferential region. Also preferably, the inclination of the enveloping surface with reference to the bracing segment is no greater, particularly preferably is less, in the entire second circumferential region than in the entire first circumferential region.

In principle, the fastening body can be any body occupying a component volume, for example a foam body, in particular a hard foam body and the like. Preferably, however, the fastening body is a shell component that is defined substantially by shells and/or shell segments which form its outer surfaces. Also preferably, in order to simplify installation the fastening body is an integrally intermaterially continuous fastening body. The fastening body, in particular constituting a shell body, is preferably constituted by injection molding.

Manufacture of the fastening body by injection molding can be simplified by the fact that the fastening body encompasses two fastening sub-bodies each of which comprises part of the bracing segment, part of the connecting segment, and part of the liner segment, the fastening sub-bodies being connected to one another via the bracing segment movably relative to one another.

Preferably the two fastening sub-bodies are connected to one another only via the bracing segment, so that the bracing segment not only constitutes the connection between the two fastening sub-bodies but furthermore defines their relative movability. Although consideration can be given to constructing a fastening body from two separate fastening sub-bodies, for example by the fact that two shell-shaped fastening sub-bodies are connected to one another via a sufficiently stable adhesive strip on the bracing segment, it is advantageous for reasons of achievable component strength and simplified manufacture of the fastening body if it is the case for each of the two fastening sub-bodies that the parts—bracing segment, connecting segment, and liner segment—contributing to the constitution of each fastening sub-body are intermaterially continuous with one another, the parts of the bracing segment which belong to different fastening sub-bodies being connected to one another, preferably being intermaterially connected to one another.

The bracing segment can be deformable, and as a result of its deformability can bring about the relative movability of the fastening sub-bodies.

The bracing segment can comprise for that purpose, in a concrete design embodiment in accordance with an advantageous refinement of the present invention, a hinge region in which the bracing segment is bendable around a bending axis, a respective part of the bracing segment belonging to a different fastening sub-body being located on each side of the hinge region.

The hinge region can already be embodied in simple fashion during injection-molded manufacture of the fastening body, for example, in integrally intermaterial fashion as a film hinge. Usability of the fastening bodies for the assembly of motor vehicles as quickly as possible after they are produced by injection molding can be achieved by the fact that the fastening sub-bodies are movable, in particular bendable or pivotable relative to one another, between an unmolding position in which the parts of the bracing segment which belong to different fastening sub-bodies enclose a smaller angle between them, and an operational readiness position in which the parts of the bracing segment which belong to different fastening sub-bodies enclose a larger angle between them.

For example, the fastening body can be manufactured, with the fastening sub-bodies in the unmolding position, by injection molding in a corresponding mold cavity; unmolded; and, after deformation into the operational readiness position and sufficient cooling, installed directly on a vehicle. According to the present invention the fastening body is preferably deformable between the unmolding position and operational readiness position even in the cooled state. It is also conceivable, however, for example in order to make the hinge more stable, to unmold the fastening body with the fastening sub-bodies in the unmolding position and to deform the fastening sub-bodies, still in the state with residual heat, into the operational readiness position, out of which they can be deformed in the finally cooled state (i.e. at room temperature) only with considerably greater force than would be the case when a film hinge is used.

Preferably the parts of the bracing segment which belong to the different fastening sub-bodies are arranged in the operational readiness position in a stretched-out position; i.e., particularly preferably, an outer surface, facing away from the liner segment, of the bracing segment forms a flat surface in the operational readiness position.

Be it noted that in the present Application, which preferably relates to an injection-molded fastening body, terms such as "flat," "flush," and the like which describe conformation and relative positions are to be understood with the tolerance necessary for injection-molded components.

The liner segment can comprise a passthrough opening that passes completely through the liner segment in a thickness direction so as thereby to enable tool access to the fastening means in the region of the bracing segment. The fastening means can be, for example, a bolt or a nut. The passthrough opening of the liner segment can be penetrated by the separation plane of the two parts, belonging to different fastening sub-bodies, of the liner segment, so that respective portions of the passthrough opening, preferably half a passthrough opening in each case, are located in those parts of the liner segment which belong to different fastening sub-bodies.

The fastening body is preferably of symmetrical configuration. A mirror symmetry of the fastening body is preferred, the aforementioned bending axis of the bracing segment then being located in the mirror-symmetry plane of the fastening body. This is also correspondingly true for the separation surface along which the two fastening sub-bodies, connected to one another only at the bracing segment, are separated from one another. That separation surface is preferably a separation plane, and is preferably likewise located in the mirror-symmetry plane of the fastening body, provided the latter is embodied mirror-symmetrically.

In the interest of weight saving, provision is preferably made that the fastening body is hollow. This is the case, for example, when the fastening body is embodied, as described above, as a shell body, and the cavity surrounded by the shell body is unfilled. It is also conceivable, however, to embody the fastening body as a shell component or shell body and to fill the cavity surrounded by the shell body entirely or partly with stabilizing material, for example with hardening foam. For even greater weight reduction, provision can be made that each fastening sub-body is hollow.

Because that lower terminating surface of the underbody liner which, in the state fully installed on the vehicle, is exposed and faces toward the road surface is impinged upon by a flow of wind blast during operation of the vehicle as intended, that flow impingement can result in wind noise if the underbody liner is too strongly profiled. One possible source of such wind noise can be a gap between the fastening boss of the underbody liner component and the fastening body inserted therein. In a refinement of the present invention, to avoid such wind noise provision can be made that the fastening body comprises on its outer surface at least one sealing configuration that projects from the outer surface and is manufactured from a different material than the bracing segment, the connecting segment, and the liner segment, which material has a lower hardness value and a lower modulus of elasticity than the material of the aforesaid segments. Such material is also referred to in the present Application as a "sealing material."

In principle, such sealing configurations can be provided at any location on the fastening body. It is particularly effective to arrange a sealing configuration in the connecting region between the connecting segment and liner segment, since that region is located close to the liner surface of the underbody liner component and can thus close off as completely as possible a gap that possibly exists between the fastening body and the inner side of a fastening boss of the underbody liner component. The aforementioned passthrough opening of the liner segment can also be closed off overridably by sealing material, for example in the manner of a curtain of sealing material projecting radially inward from the opening edge.

The at least one sealing configuration can be manufactured by injection molding in the course of a two-component injection molding method with which preferably the shell body of the fastening body is manufactured using a first, harder and stiffer material, and with which the at least one sealing configuration made of the sealing material is injection-applied onto the fastening body.

In principle, the fastening body can comprise on its outer side at least one spacer configuration, in particular on its enveloping surface between the spacing segment and liner segment, preferably only there. The one or several spacer configurations can be produced integrally with the fastening body during injection-molded manufacture thereof. The at least one spacer configuration can also be manufactured from the sealing material, already described above, for constituting the at least one sealing configuration.

The sealing configuration and/or the spacer configuration abut, with their end segment facing away from the fastening body in the fully installed state, against the liner surface of the underbody liner component and/or against the inner surface of the fastening boss of the underbody liner component in which the fastening body is inserted.

The object recited previously is also achieved by an installation set encompassing a motor vehicle underbody liner component having a liner surface extending along the vehicle underbody when the underbody liner is in the installed state, and having a hollow fastening boss projecting from the liner surface; and further encompassing a fastening body which, in the operationally ready state, is arrangeable in the fastening boss.

The motor vehicle underbody liner component can be a solid plastic component or can be manufactured from a LWRT. It can furthermore be a mixture of several materials, for example solid plastic and LWRT.

In order to improve the aerodynamics of a vehicle as furnished by an underbody liner, provision is particularly preferably made, as already described above, that the outer surface of the liner segment of the fastening body, when the latter is arranged as intended in the fastening boss, terminates substantially flush against the surrounding liner surface of the motor vehicle underbody liner component.

"Flush" is to be understood here once again with the tolerances usual for injection molding methods; in other words, an offset of no more than 2 mm between the liner surface of the underbody liner component and the outer surface of the liner segment of the fastening body is also to be considered "flush" for purposes of the present Application.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
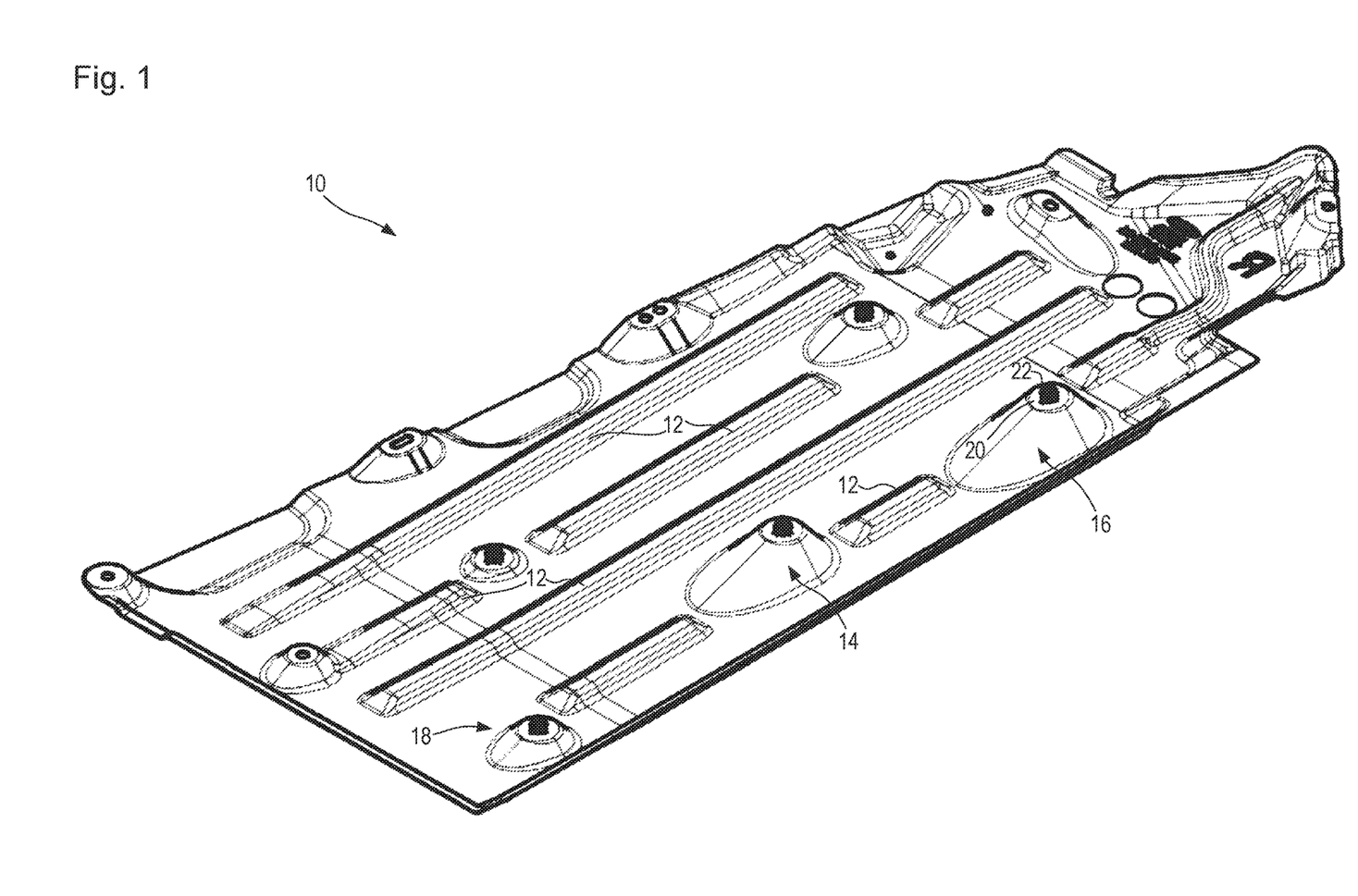
FIG. 1 is a perspective view of that side of a motor vehicle underbody liner component which faces toward a vehicle underbody.

Referring now to the drawings wherein the showings are for the purpose of illustrating preferred and alternative embodiments of the invention only and not for the purpose of limiting the same, FIG. 1 shows a vehicle underbody component that is labeled generally as 10. FIG. 1 is a perspective view of underbody liner component 10, such that the viewer of FIG. 1 is looking at that surface of the underbody liner component which, in the fully installed state, faces toward the vehicle that is carrying it.

Underbody liner component 10 is a planar component, i.e. it has a considerably smaller dimension in its local thickness direction than in its two main extension directions that are orthogonal both to the thickness direction and to one another. Because, as is evident from FIG. 1, underbody liner component 10 is embodied not simply as a flat panel but in profiled fashion, the individual local thickness directions can differ from one another in terms of their orientation in a coordinate system that is stationary but not peculiar to the component.

Creases 12 that are embodied in underbody liner component 10 by deformation may be mentioned merely by way of example as profiling.

Figure 2:
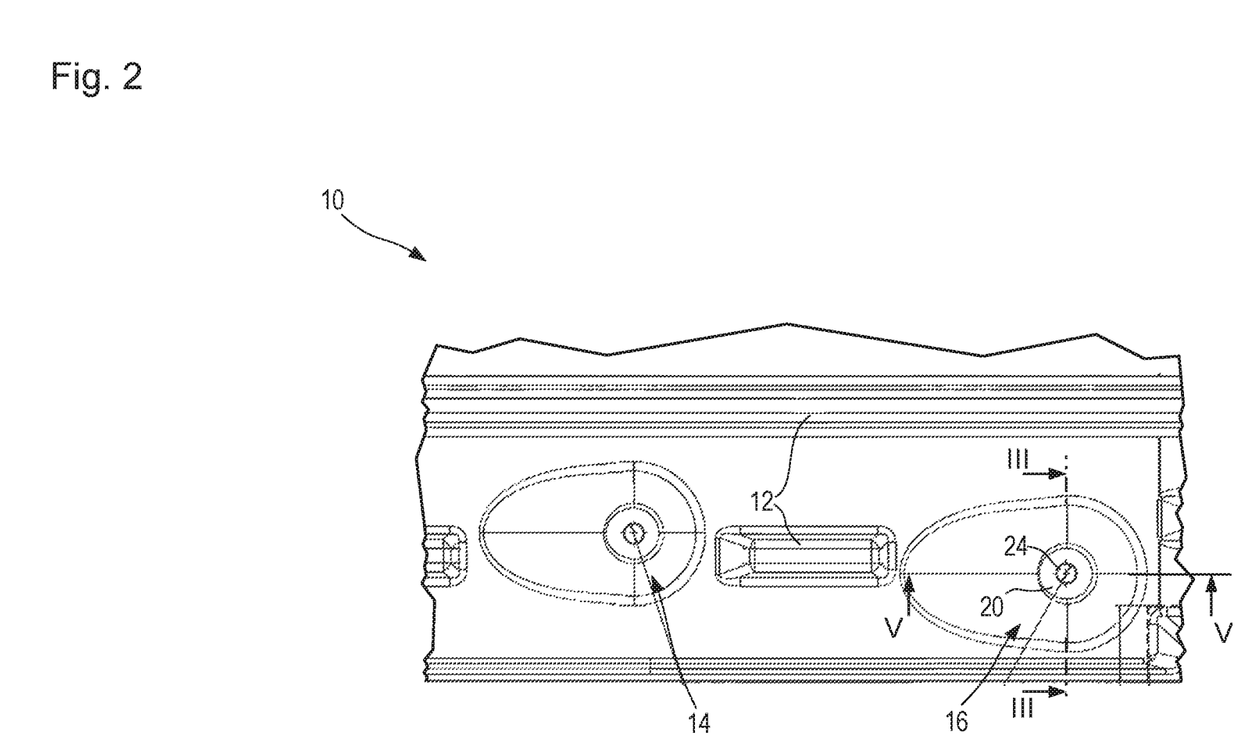
FIG. 2 is a plan view of a detail of the underbody liner component of FIG. 1.

Underbody liner component 10 furthermore comprises a plurality of boss-like bulged-out fastening bosses, differing in terms of their size and conformation, of which fastening bosses 14 and 16 are also depicted in FIG. 2. The reference character 18 also designates a fastening boss. Reference will be made hereinafter more to fastening boss 16, however, which is also employed in the subsequent Figures in order to explain the present invention. For example, fastening bosses 14, 16, and 18 differ only in terms of their size, but are identical in terms of their proportions. This means that fastening bosses 14, 16, and 18 can substantially be transformed into one another by scaling. Given the aforesaid scaling condition, the description of fastening boss 16 therefore also applies to further fastening bosses of underbody liner component 10.

Fastening boss 16 tapers with increasing distance from the surrounding remaining liner component and has at its terminal region or summit region, located remotely from the remainder of the liner component, an installation segment 20 that is preferably flat for easier installation. Embodied in installation segment 20 is an installation opening 24 that passes through said segment, although said opening is not visible in FIG. 1 because a fastening means 22 is arranged in it. Installation opening 24 is, however, visible in FIGS. 2, 3, and 5.

Boss-like bulged-out fastening boss 16 is hollow, and is open toward the liner surface—not visible in FIGS. 1 and 2 because it faces away from the viewer of the respective Figures—of underbody liner component 10.

Fastening body 26 of the present Application, as depicted in FIGS. 3 to 6, is proposed in order to facilitate installation of underbody liner component 10 on a vehicle underbody and in order to improve its aerodynamic properties.

Figure 3:
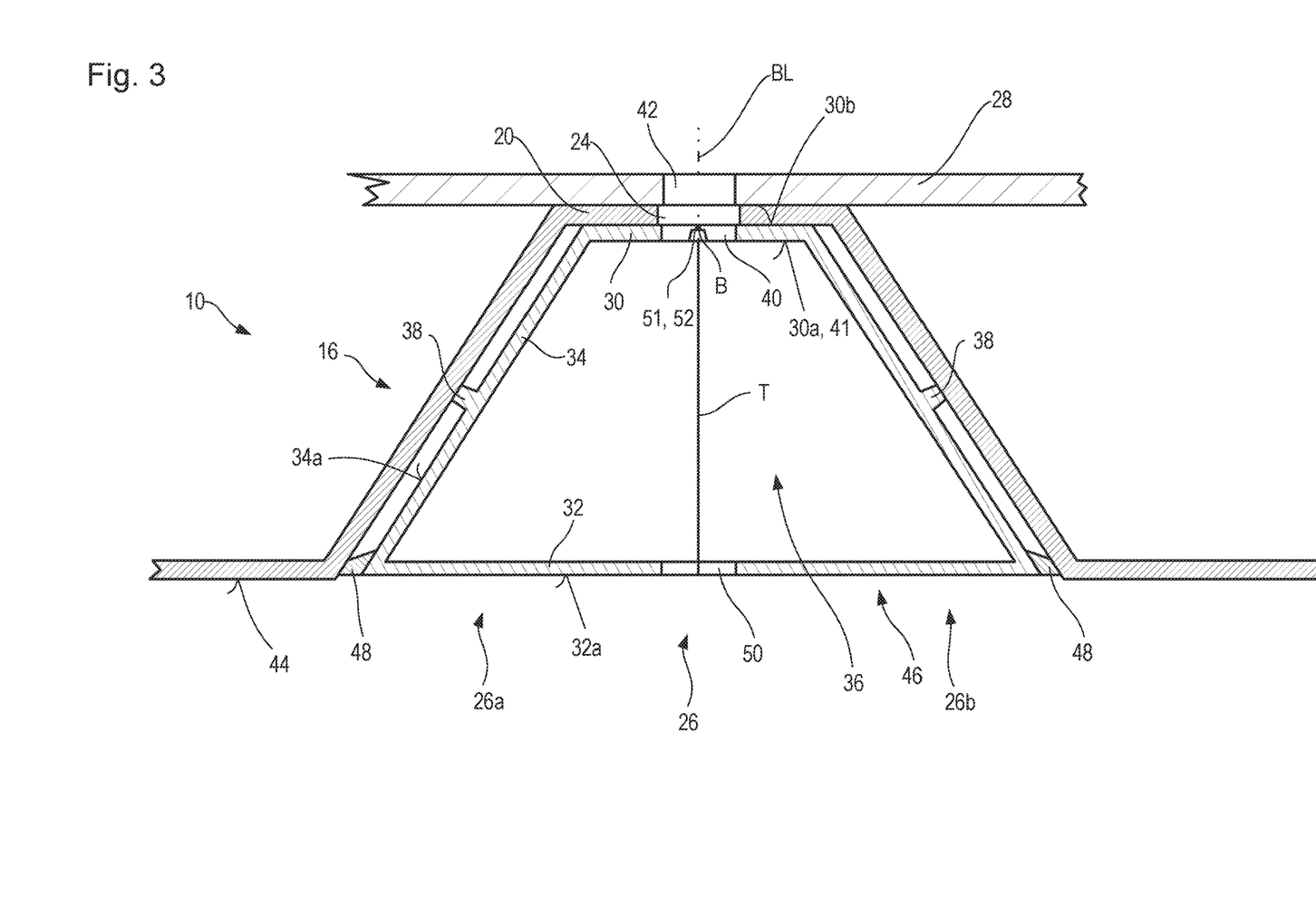
FIG. 3 is a cross section through an underbody liner installed on a vehicle underbody, encompassing the underbody liner component of FIG. 1 and an embodiment according to the present invention of a fastening element of the present Application in the operational readiness position. The section plane of FIG. 3 is plane III-III in FIGS. 2 and 6.
Figure 5:
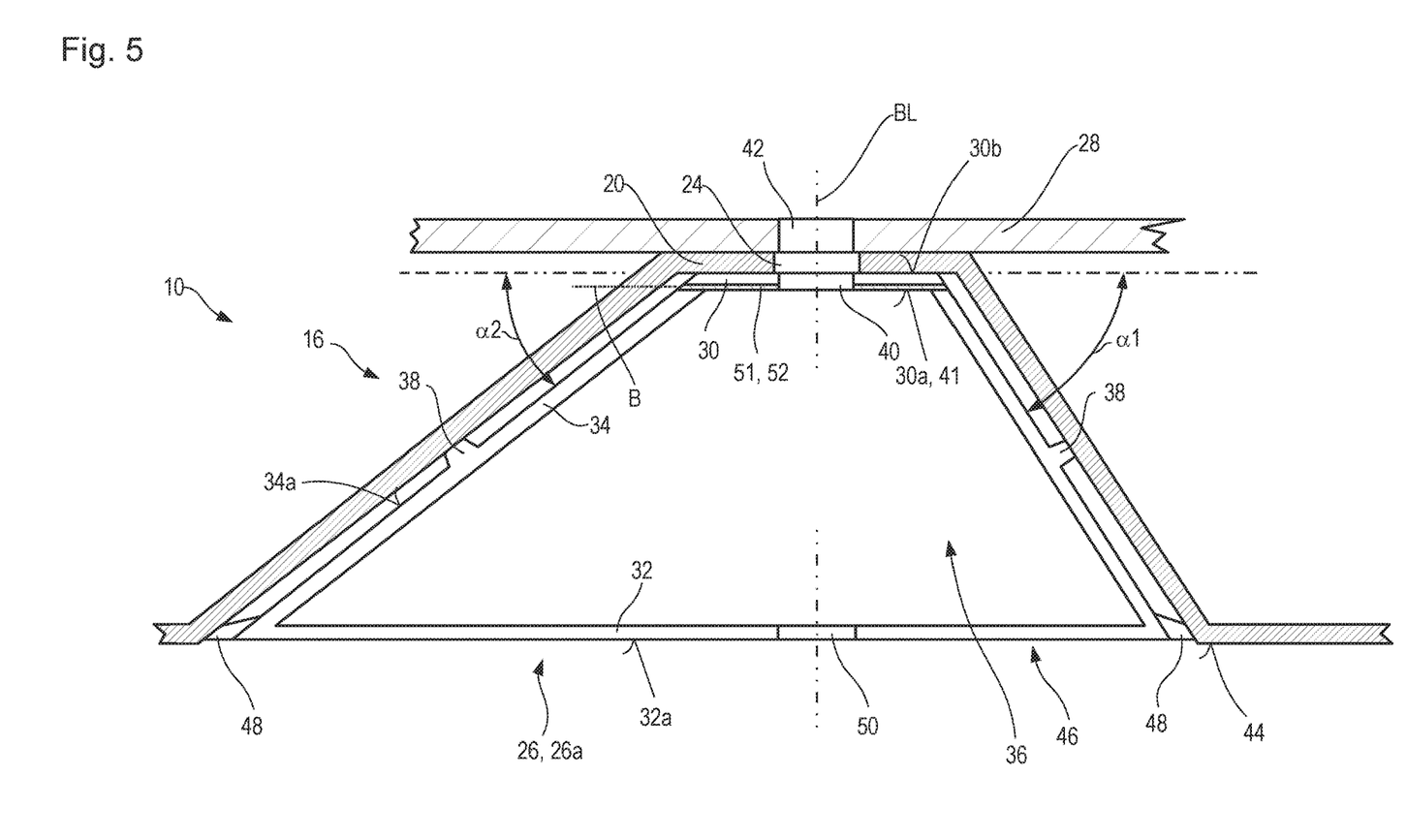
FIG. 5 is a longitudinal section view through the arrangement of FIG. 3 along section plane V-V of FIGS. 2 and 6.

In FIGS. 3 and 5 underbody liner component 10 is depicted, along with installation segment 20 of fastening boss, respectively abutting from below against a vehicle underbody 28. Fastening means 22 that connects underbody liner component 10 to vehicle underbody 28 is not depicted in FIGS. 3 and 5 but instead merely represented by its longitudinal fastening means axis BL. Fastening means 22 can be, for example, a bolt, a nut, or a bolt-nut combination and the like.

Figure 6:
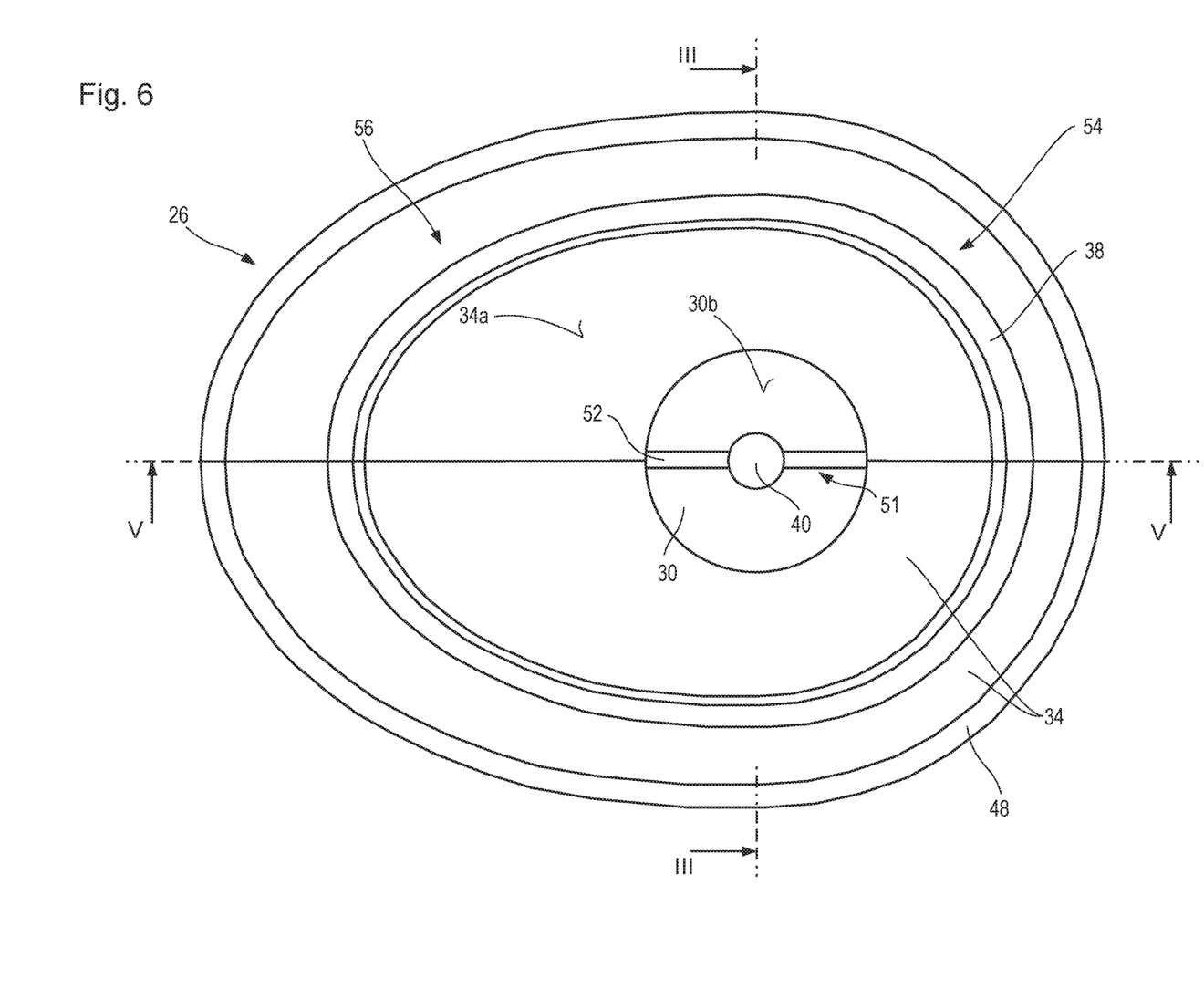
FIG. 6 is a plan view of the fastening body according to the present invention of FIGS. 3 and 5.

FIG. 3 is a schematic section view along section plane III-Ill of FIG. 2 in terms of the section through underbody liner component 10, and along section plane III-Ill of FIG. 6 in terms of the section plane through fastening body 26.

Fastening body 26 has a bracing segment 30 and a liner segment 32 arranged at a distance therefrom. Bracing segment 30 and liner segment 32 are connected to one another by a connecting segment 34. Fastening body 26 is thus embodied as an irregularly frustoconical shell body, since it is internally hollow.

Bracing segment 30 and liner segment 32 each form, in the operational readiness position shown in FIGS. 3 and 5, substantially parallel end surfaces 30b and 32a, arranged at a distance from one another, of the frustoconical basic conformation. Connection segment 34 forms a circumferential enveloping surface 34a.

As is evident from FIGS. 3 and 5, fastening body 26 in its operational readiness position is embodied substantially complementarily to cavity 36 enclosed by fastening boss 16. This means that fastening body 26 has substantially the same internal conformation as cavity 36 and is located oppositely from the inner surface of fastening boss 16 with narrow gap dimensions, in order to fill it up as completely as possible.

Connecting segment 34 can comprise, on its outer side that faces toward fastening boss 16 in the fully installed state, one or several spacer configurations 38 that can be embodied integrally intermaterially with connecting segment 34.

Those end surfaces of spacer configurations 38 which face away from connecting segment 34 abut against the inner surface of fastening boss 16 in order to stabilize connecting segment 34 in its fully installed placement state.

Bracing segment 30 abuts with its outer surface 30b against installation segment 20, so that installation opening 24 and a passthrough opening 40 of bracing segment 30 align with one another. Shanked fastening means can thus pass simultaneously through installation opening 24 and passthrough opening 40. The two openings 24 and 40 furthermore align with a fastening opening 42 in vehicle underbody 28.

Bracing segment 30, and also liner segment 32, are arranged substantially in a stretched-out flat position when fastening body 26 is in the operational readiness position shown in FIGS. 3 and 5.

An outer surface 32a of liner segment 32 which faces outward with respect to fastening body 26 is substantially flush with a liner surface 44, surrounding fastening boss 16, of underbody liner component 10. Those surfaces—outer surface 32a of liner segment 32, and liner surface 44 of underbody liner component 10—of underbody liner component 10 which face outward on the fully assembled vehicle contribute collectively to forming the lower terminating surface of the vehicle and the underbody liner that is constituted from underbody liner component 10 and fastening bodies 26.

As is evident from FIGS. 3 and 5, outer surface 32a of liner component 32 covers a large part of opening 46 constituted by fastening boss 16 in the plane of liner surface 44, and closes it off in large part.

In order to avoid wind noise that could occur as a result of wind blast flowing along the lower terminating surface of the underbody liner, a sealing configuration 48 made of a sealing material that is softer, and has a lower modulus of elasticity, than the material from which bracing segment 30, connecting segment 34, and liner segment 32 are constituted, is arranged on fastening body 26, in the present exemplifying embodiment more precisely on that end segment of connecting segment 34 which is located closest to liner segment 32.

When the underbody liner component is in the fully installed state, sealing configuration 48 comes into abutment against liner surface 44 or against an inner surface of fastening boss 16, and then completely closes off opening 46 of fastening boss 16 in the plane of connecting surface 44 together with liner segment 32.

A passthrough opening 50 can furthermore be embodied in liner segment 32 in order to enable tool access through it to a fastening element that passes through bracing segment 30 and that comes into abutment, with a bearing region, against inner surface 30a of a bracing region 41 of bracing segment 30 which surrounds passthrough opening 40. The tear-out resistance of fastening boss 16, and of its installation segment 20 in the region of installation opening 24, can thereby be enhanced by a thickening of material.

Interposition of a washer between a bearing segment (counterpart bracing region) of the fastening means, for example an end face of a nut or an annular surface of a bolt head facing toward the shank of a bolt and surrounding it, and installation segment 20, can be omitted, or tear-out resistance can be even further enhanced if the washer is used.

Fastening body 26 comprises two fastening sub-bodies 26a and 26b that are separated from one another along a separation plane T located in the drawing plane of FIG. 5 and are connected to one another only by bracing segment 30. Bracing segment 30 comprises for this purpose, in a hinge region 51, a film hinge 52 embodied integrally with the remainder of bracing segment 30. Film hinge 52 is therefore also the only body segment of fastening body 26 which is located in section plane V-V of FIG. 6.

The segments of fastening body 26—bracing segment 30, liner segment 32, and connecting segment 34—are preferably connected intermaterially integrally to one another, and are manufactured using an injection molding method. Sealing configuration 48 has been injection-applied, using a two-component injection molding method, onto segments 30, 32, and 34 that are produced by injection molding.

Figure 4:
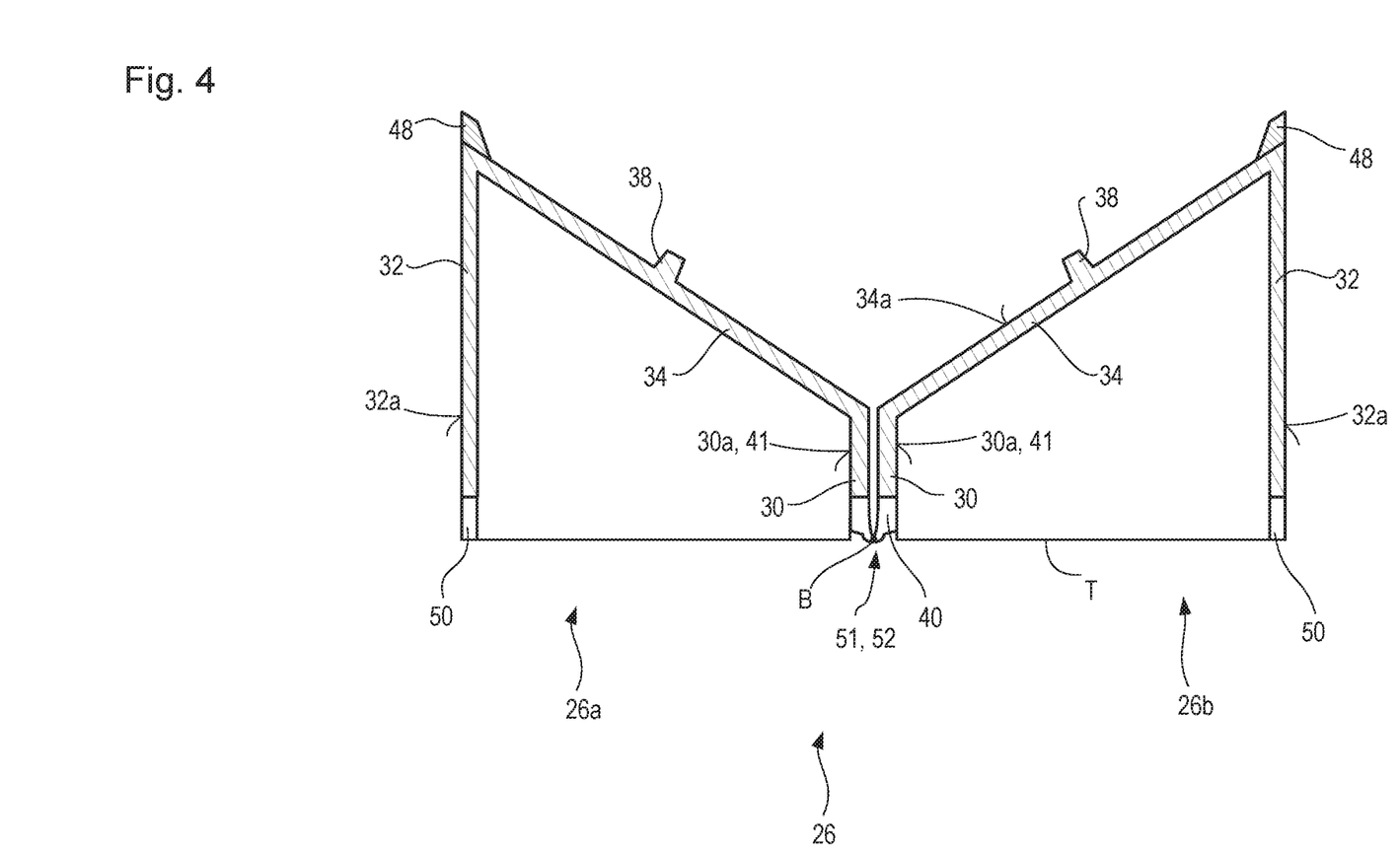
FIG. 4 shows the fastening body of FIG. 3 in the unmolding position.

FIG. 4 shows fastening body 26 in its unmolding position in which it can be unmolded from a mold cavity after being manufactured.

In the unmolding position shown in FIG. 4, the two parts of bracing segment 30a which belong to different fastening sub-bodies 26a and 26b are folded toward one another around film hinge 52 and abut against one another.

The two fastening sub-bodies 26a and 26b are therefore pivotable or deformable relative to one another around a bending axis B that is defined by film hinge 52 and is oriented orthogonally to the drawing plane of FIGS. 3 and 4.

In the unmolding position, the component edges, located in separation plane T, of fastening sub-bodies 26a and 26b are preferably in a stretched-out position, while in the operational readiness position they abut against one another.

As is evident from FIGS. 5 and 6, fastening body 26 has a first circumferential region 54 and a second circumferential region 56 which supplement one another to yield the entire circumference.

In the first circumferential region, the outer side of connecting segment 34, which serves as an enveloping surface of fastening body 26, has with respect to bracing segment 30 a first inclination angle $\alpha 1$ that is larger than in second circumferential region 56. Therefore, enveloping surface 34a, constituted by the outer side of connecting segment 34, has a smaller inclination angle $\alpha 2$ with bracing segment 30 in section plane V-V. The transition from first circumferential region 54 to second circumferential region 56 lies in section plane III-Ill of FIG. 6. Each circumferential region 54 and 56 therefore covers 180° of circumference.

While inclination angle $\alpha 1$ in first circumferential region 54 is substantially constant over the entire circumferential region 54, in second circumferential region 56 inclination angle $\alpha 2$ changes, starting from the circumferential edge in section plane III-Ill where it is substantially identical to inclination angle $\alpha 1$, to the minimum inclination angle in separation angle T or section plane V-V.

Fastening body 26 is mirror-symmetrical with respect to separation plane T or section plane V-V.

Inclination angle $\alpha 2$ is preferably no greater in second circumferential region 56 than in first circumferential region 54, and particularly preferably is less than in first circumferential region 54, with the exception of the edge region, where inclination angles $\alpha 1$ and $\alpha 2$ of the two circumferential regions 54 and 56 are identical in order to avoid discontinuities.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A fastening body for fastening an underbody liner component to a motor vehicle underbody, the fastening body comprising:
   a bracing segment having a passthrough opening penetrable along a penetration axis by a fastener when the fastening body is in an operationally ready state, and having a bracing region, embodied in a surrounding region of the passthrough opening, which is provided for abutment of a counterpart bracing region of the fastener;

a liner segment that is arranged at a distance from the bracing segment and comprises, at least on its outer side facing away from the bracing region, an outer surface; and a connecting segment connecting the bracing segment and the liner segment, wherein the fastening body is hollow.

2. The fastening body according to claim 1, wherein the outer surface of the outer side of the liner segment is generally flat.

3. The fastening body according to claim 1, wherein the fastening body has, in the operationally ready state, a conformation that tapers from the liner segment toward the bracing segment such that the bracing segment constitutes a smaller end surface, the liner segment a larger end surface, and the connecting segment an angled enveloping surface.

4. The fastening body according to claim 3, wherein the enveloping surface of the tapering fastening body has along its circumference different inclination angles relative to the bracing segment, the enveloping surface including a first circumferential region and a second circumferential region, the first circumferential region extends over approximately at least a quarter of its circumference and includes a first inclination angle in a first inclination angle range; the second circumferential region being different from the first circumferential region and extends over approximately at least a quarter of its circumference and includes a second inclination angle in a second inclination angle range, the second inclination angle range containing inclination angles having smaller values than the first inclination angle range.

5. The fastening body according to claim 4, wherein at least one of the first circumferential region includes the first inclination angle range extending over at least half of its circumference and the second circumferential region includes the second inclination angle range extending over at least half of its circumference.

6. The fastening body according to claim 1, wherein the fastening body encompasses two fastening sub-bodies each of which comprises part of the bracing segment, part of the connecting segment, and part of the liner segment, the fastening sub-bodies being connected to one another via the bracing segment and being movably relative to one another.

7. The fastening body according to claim 6, wherein it is the case for each of the two fastening sub-bodies that the parts—the bracing segment, the connecting segment, and the liner segment—contributing to the constitution of each fastening sub-body are intermaterially continuous with one another, the parts of the bracing segment which belong to different fastening sub-bodies being connected to one another.

8. The fastening body according to claim 7, wherein the parts of the bracing segment which belong to the different fastening sub-bodies are intermaterially connected to one another.

9. The fastening body according to claim 6, wherein the bracing segment is deformable, and the deformability of the bracing segment brings about the relative movability of the fastening sub-bodies.

10. The fastening body according to claim 9, wherein the bracing segment comprises a hinge region in which the bracing segment is bendable around a bending axis, a respective part of the bracing segment belonging to a different fastening sub-body being located on each side of the hinge region.

11. The fastening body according to claim 10, wherein the fastening sub-bodies are movable between an unmolding position in which the parts of the bracing segment which belong to different fastening sub-bodies enclose a smaller angle between them, and an operational readiness position in which the parts of the bracing segment which belong to different fastening sub-bodies enclose a larger angle between them.

12. The fastening body according to claim 11, wherein in the operational readiness position the parts of the bracing segment which belong to the different fastening sub-bodies are arranged in a stretched-out position.

13. The fastening body according to claim 6, wherein each of the fastening sub-bodies is hollow.

14. The fastening body according to claim 1, further including an installation set encompassing a motor vehicle underbody liner component having a liner surface that is at least generally parallel to the vehicle underbody when the underbody liner component is in an installed state, the underbody liner component having a hollow fastening boss projecting from the liner surface; the fastening body, in the operationally ready state, is arrangeable in the fastening boss.

15. The fastening body according to claim 14, wherein the outer surface of the liner segment of the fastening body, when the fastening body is arranged as intended in the fastening boss, terminates substantially flush against the surrounding liner surface of the motor vehicle underbody liner component.

16. A fastening body for fastening an underbody liner component to a motor vehicle underbody, the fastening body comprising:

a bracing segment having a passthrough opening penetrable along a penetration axis by a fastener when the fastening body is in an operationally ready state, and having a bracing region, embodied in a surrounding region of the passthrough opening, which is provided for abutment of a counterpart bracing region of the fastener;

a liner segment that is arranged at a distance from the bracing segment and comprises, at least on its outer side facing away from the bracing region, an outer surface; and a connecting segment connecting the bracing segment and the liner segment, wherein the fastening body has, in the operationally ready state, a conformation that tapers from the liner segment toward the bracing segment such that the bracing segment constitutes a smaller end surface, the liner segment a larger end surface, and the connecting segment an angled enveloping surface, wherein the conformation that tapers from the liner segment toward the bracing segment has a frustoconical conformation.

17. A fastening body for fastening an underbody liner component to a motor vehicle underbody, the fastening body comprising:

a bracing segment having a passthrough opening penetrable along a penetration axis by a fastener when the fastening body is in an operationally ready state, and having a bracing region, embodied in a surrounding region of the passthrough opening, which is provided for abutment of a counterpart bracing region of the fastener;

a liner segment that is arranged at a distance from the bracing segment and comprises, at least on its outer side facing away from the bracing region, an outer surface; and a connecting segment connecting the bracing segment and the liner segment, the fastening body further comprising at least one sealing configuration that is formed from a first material, at least one of the bracing segment, the connecting segment, and the liner segment being formed from a second material, the first material being different than the second material, the first material having at least one of a lower hardness value and a lower modulus of elasticity than the second material.

18. The fastening body according to claim 17, wherein the at least one sealing configuration projects from the outer surface.

19. The fastening body according to claim 17, wherein the at least one sealing configuration is in a connecting region between the connecting segment and liner segment.

* * * * *